Nov. 28, 1967  R. A. HANSON  3,354,801
HIGHWAY SLIPFORM
Filed June 17, 1965  9 Sheets-Sheet 6

INVENTOR.
RAYMOND A. HANSON
BY
ATTYS.

Nov. 28, 1967  R. A. HANSON  3,354,801
HIGHWAY SLIPFORM

Filed June 17, 1965  9 Sheets-Sheet 8

INVENTOR.
RAYMOND A. HANSON
BY
*Wells & St.John*
ATTYS.

United States Patent Office 3,354,801
Patented Nov. 28, 1967

3,354,801
HIGHWAY SLIPFORM
Raymond A. Hanson, Palouse, Wash. 99161
Filed June 17, 1965, Ser. No. 464,686
7 Claims. (Cl. 94—46)

This invention relates to a novel slipform for placing a cementitious lining on a prepared highway subgrade. The apparatus described constitutes a continuous slipform for movement in a forward direction while placing the desired concrete lining on the surface traversed.

Concrete paving of highway surfaces has resisted most current pressure toward automation due to the high degree of accuracy required to properly pave a highway surface for use by automobiles and trucks. The present invention provides a distribution and metering arrangement for a constantly moving highway slipform that can insure the required accuracy necessary in such an application, minimizing the amount of manual effort required to maintain a constant surface configuration and pavement thickness. This involves two sets of metering devices as well as a finishing screed, the metering devices being usable together as shown, or separately when this is feasible.

It is a first object of this invention to provide a novel slipform having a unique frame and header configuration together with a metering arrangement for insuring that excess concrete does not pass beneath the machine to then "boil up" behind the final screed.

Another object of this invention is to provide a highway slipform that can be automated for accurate grade control, the device being usable relative to pre-set string lines to lay a concrete lining at a desired surface elevation with accuracy and efficiency.

Another object of this invention is to provide a unique metering arrangement whereby the metering devices that allow a given quantity of concrete to pass into the machine automatically compensate for adjustments effected by automatic controls associated therewith. The metering arrangement allows more or less concrete to enter the machine, depending upon the particular circumstances encountered by the apparatus, and automatically compensates for the necessary increase or decrease in quantity when the correction has been effected.

Another object of this invention is to provide a unique header arrangement that is capable of being utilized to bring the slipform into adjacent contact with preformed concrete slaps such as are encountered at bridges and other pre-built installations along a highway right of way. These and further objects will be evident from the following disclosure, taken together with the accompanying drawings, the drawings being used to describe a preferred form of the invention which is not to be construed as to limit the scope of the invention except as it is defined in the appended claims.

Figure 1:
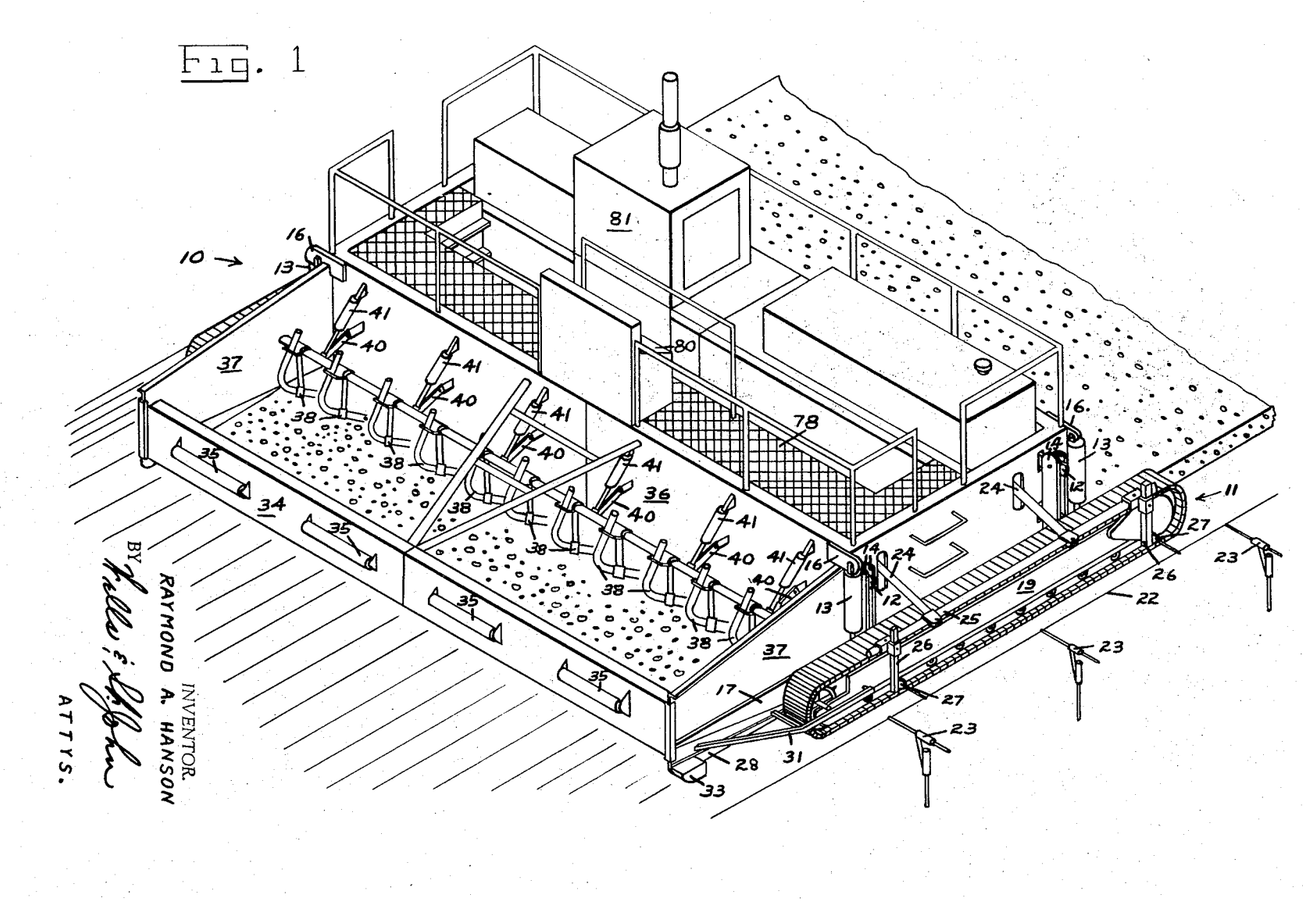
FIGURE 1 is a perspective view of the complete machine showing its operation in lining a highway right of way.

The drawings illustrate one specific embodiment of this invention, shown in FIGURE 1 as a complete machine for highway paving. The remaining figures eliminate the upper superstructure including the motor and control units, and show only the mechanical paving apparatus with which the disclosure is primarily concerned. The machine as illustrated in FIGURE 1 is made in two sections, each being a common paving width (12 feet). For this reason, the drawings generally illustrate only one half of the machine, the figures being broken at the center line of the machine so as to utilize a larger scale and avoid unecessary duplication of the disclosure.

As shown in the drawings, a rigid mobile framework 10 is supported at its sides by crawler track units 11. The crawler track units 11 engage the adjacent ground surfaces and elevationally carry the framework 10 for movement in a forward direction so as to traverse the prepared subgrade surface that is to be paved.

Figure 7:
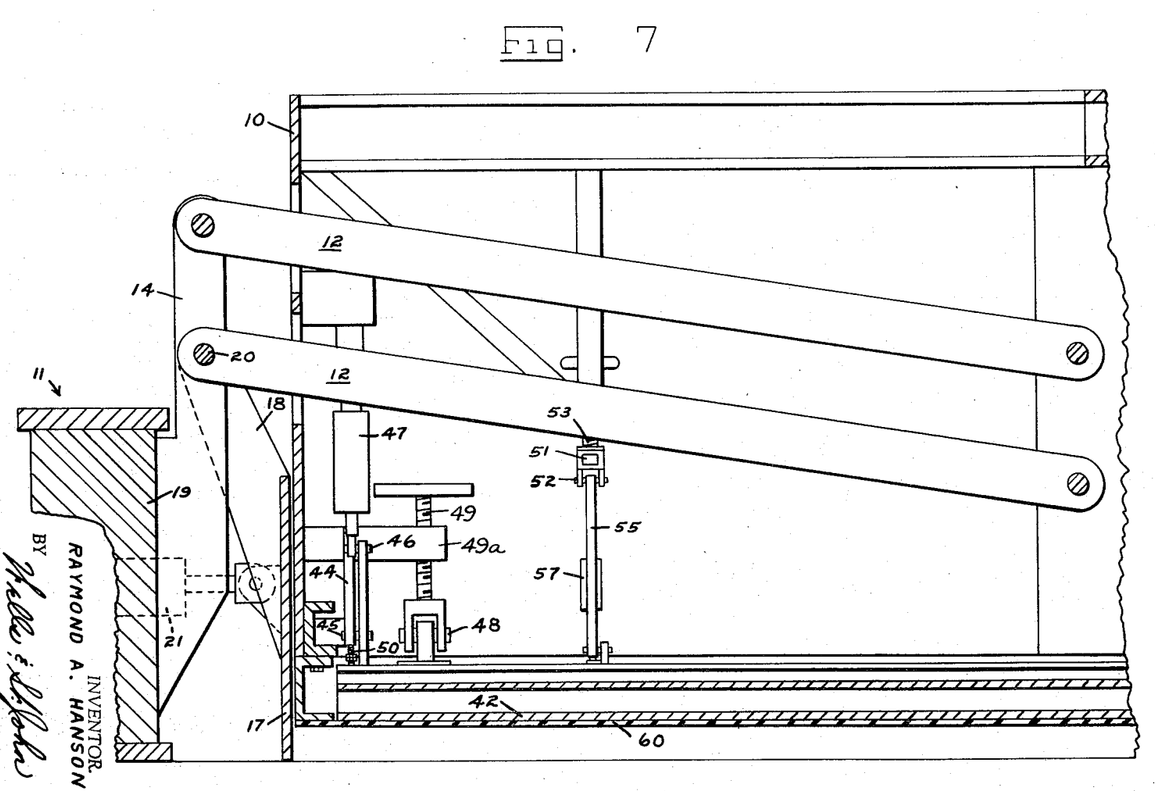
FIGURE 7 is a fragmentary sectional view of the track and header support apparatus as seen along line 7—7 in FIGURE 2.
Figure 8:
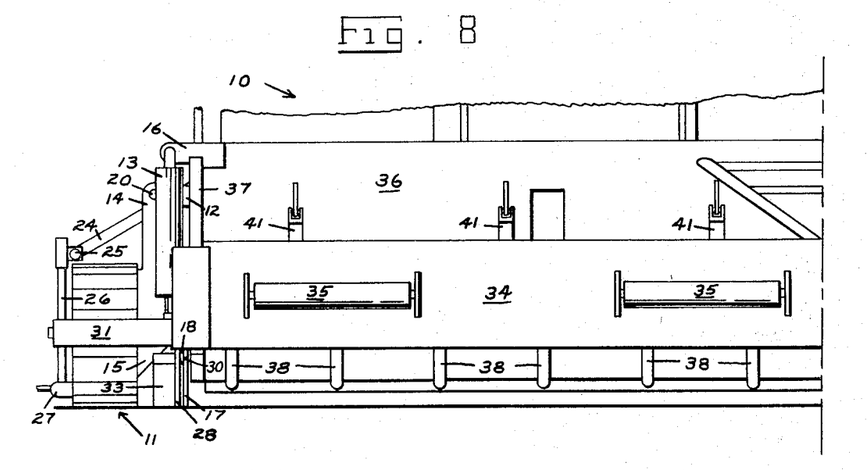
FIGURE 8 is a front view of the apparatus shown in FIGURE 2.
Figure 9:
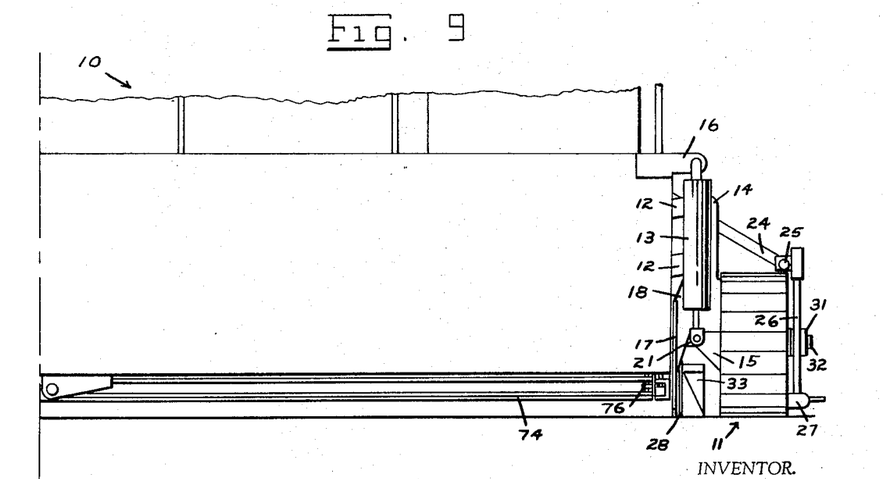
FIGURE 9 is a rear view of the apparatus shown in FIGURE 2.

Each track unit 11 is mounted on a track frame 19 pivotally carried on the framework 10 by elongated support arms 12 (FIGURE 7.) The parallel support arms 12 maintain the track frames 19 in a constant angular relationship relative to framework 10, but permit necessary elevational adjustment of framework 10 to maintain the required grade on the paved surface. The outer ends of the support arms 12 are pivotally connected to a bracket 14 at both the front and rear ends of the respective track frame 19.

The elevation of the track frames 19 is governed by hydraulic cylinders 13 at the front and rear of framework 10, each having a reciprocable piston rod pivotally connected at its lower end to a bracket 15 on the frame 19 and at its upper end to a bracket 16 on the framework 10. Reciprocation of the piston rods in the cylinder assemblies 13 will therefore adjust the elevation of the track units 11 relative to framework 10 and govern the relative height of framework 10 above the surface on which the track units 11 are supported.

Also mounted on the track frame 19 at each side of the machine is a header 17 that extends from the front of the machine to an intermediate location. Each header 17 provides an accurate surface against which the side of the pavement being laid in place is formed. Each header 17 is pivotally carried on the respective frames 19 by upwardly extending brackets 18. Brackets 18 are pivoted to the frames 19 about pivotal connections 20. The angular relationship between header 17 and track frame 19 is governed by small horizontal cylinder assemblies 21 pivotally connected between the frame 19 and header 17 in the manner best seen in FIGURE 7.

The apparatus is adapted to be automatically controlled if so desired by a fixed control string 22 located alongside the desired path of the machine. The string 22 is shown generally mounted on supporting post 23. Front and rear detector units 27 are carried on the machine by a fixed supporting apparatus comprised of fixed arms 24 extended out from one side of framework 10, a longitudinal support 25 fixed to the outer ends of the arms 24 and adjustable upright brackets 26 on which are mounted the detector units 27. The units 27 automatically detect variations in elevation between the framework 10 and string 22 and are used conventionally to operate valves that control the cylinders 13 and, if desired, automatic steering controls for the track units 11. This disclosure is not concerned with the details of such controls, which have been developed in the past as shown in Patent No. 3,247,771, and no further details along this line are believed necessary. The machine could be manually operated or controlled by any desired type of automatic or semi-automatic control assembly.

Figure 2:
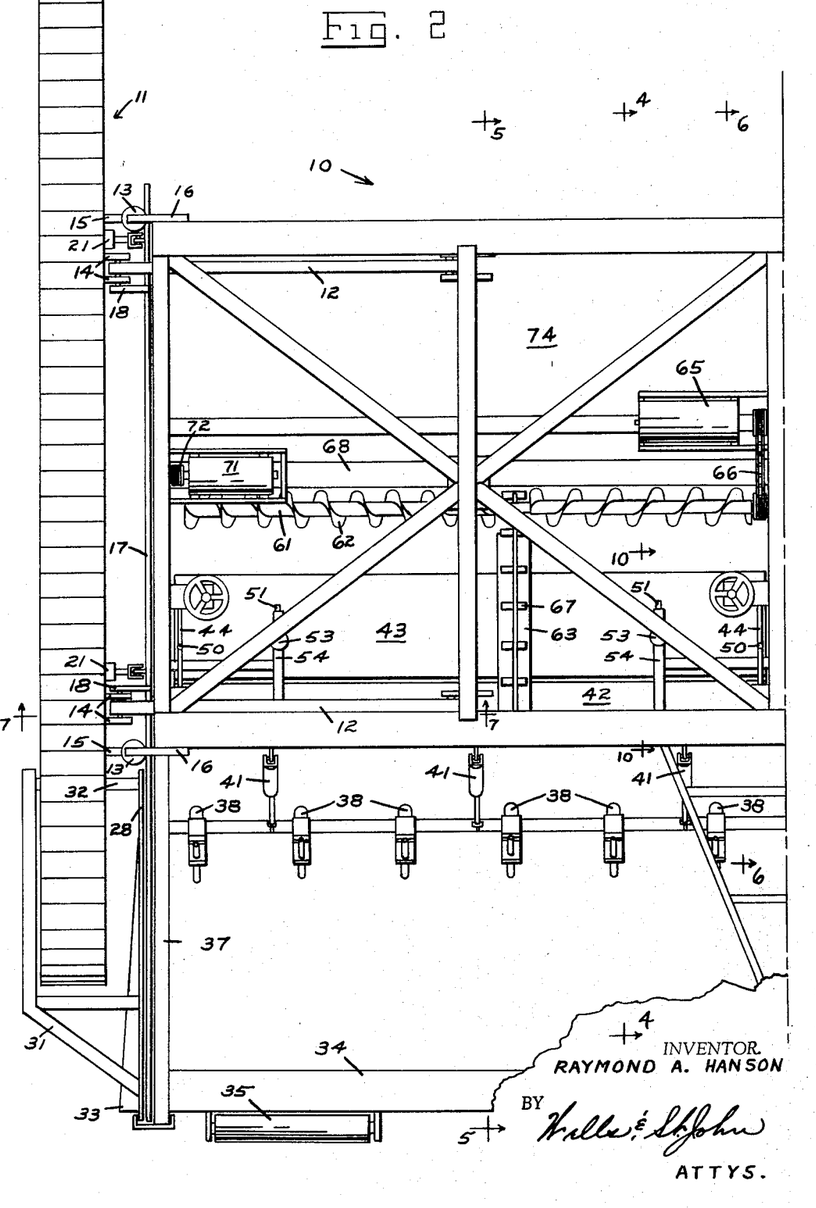
FIGURE 2 is a top view of the operating portions of the slipform, one half of the machine being illustrated to the center line thereof.
Figure 3:
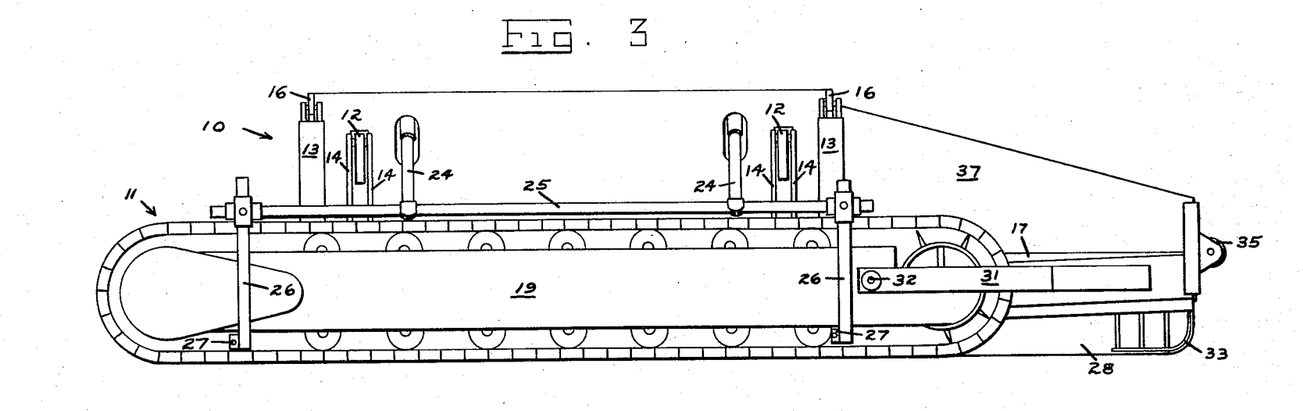
FIGURE 3 is a side view of the operating structure as seen from the left in FIGURE 2.

The headers 17, as previously described, are generally rectangular. They extend from the front of the machine to the rear of the framework 10, as can be seen in FIGURE 2. Each header 17 is relieved along its front section by a rectangular portion formed so that the forward bottom edge of header 17 is not in direct ground contact. This section is located forwardly of the portion of the machine at which the lining material is metered and smoothed to the desired pavement configuration. It is desirable to provide such relief at the front of headers 17 so that the slipform can be run up adjacent to pavement slabs and other obstructions that are occasionally encountered during the paving of a highway right of way. For instance, there normally is a slab of concrete located at each side of a bridge, the bridge and slab usually being poured before the main portion of the highway. If no relief is provided at the forward end of headers 17, the machine must stop with the paving portions thereof located at a substantial distance from the slab or obstruction, requiring manual placement of concrete to meet the slab.

As shown in FIGURES 1 through 10, the front end of each header 17 is provided with an upright pivoted section 28 located adjacent to the main header 17. The pivoted section 28 is provided with an outside brace 31 that extends around the outer side of the track unit 11 and which is pivoted, together with the main body of section 28, about a common pivotal axis. This axis is composed of a pivot shaft 32 for the brace 31 on the track frame 19 and a coaxial pivot shaft for the pivoted section 28 on the header 17.

The front end of the pivoted section 82 is provided with a wide skid 33 adapted to ride over any fixed obstruction which might be encountered thereby. This permits the front end of the header 17 to pass over obstructions, thereby allowing the machine to more closely approach and ride over previously poured concrete slabs, so that the machine can lay pavement right up to a previously formed slab. When automatic controls are used, the controls will compensate for the lifting of the track units onto the slab, maintaining the framework 10 in the desired elevation and angular relationship for proper surface configuration even though the track units 11 might be at a substantial angle due to engagement of the obstruction or slab.

The front wall 34 of framework 10 is provided with forward rollers 35 which project outwardly therefrom at a relatively low elevation. The purpose of rollers 35 is to permit abutment of the machine with the rear wheels of concrete trucks during discharge of concrete into the framework 10 to prevent damage to the slipform and trucks due to such engagement.

Framework 10 is provided with an upright barrier 36 rearwardly spaced from the front wall 34 and bounded at its sides by side walls 37. This area between front wall 34, barrier 36 and side walls 37 in effect is a hopper or storage area for concrete or cementitious material that is to be metered and smoothed by the slipform. This concrete can be directly dumped onto the surface beneath the machine between these machine portions by trucks located at the side of the slipform or forward of the slipform and moving along at the same rate of speed as the slipform. To facilitate movement of concrete beneath the barrier 36, conventional vibrator units 38 are mounted on the forward surface of the upright barrier 36 by pivoted brackets 40. Movable cylinder assemblies 41 selectively vary the location of the vibrator units 38 as might be decided due to the consistency of the concrete being utilized on a particular job.

Figure 4:
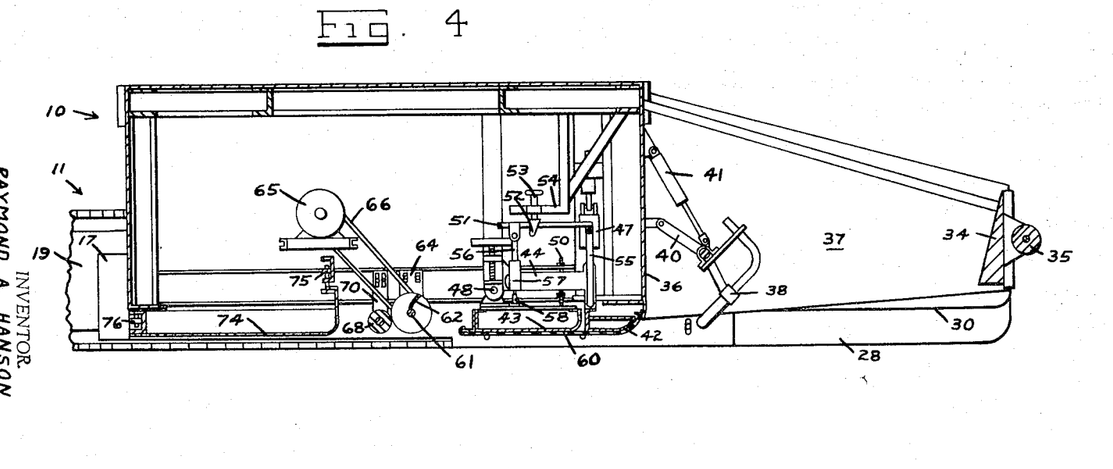
FIGURE 4 is a cross sectional view through the operating structure as seen along line 4—4 in FIGURE 2.
Figure 5:
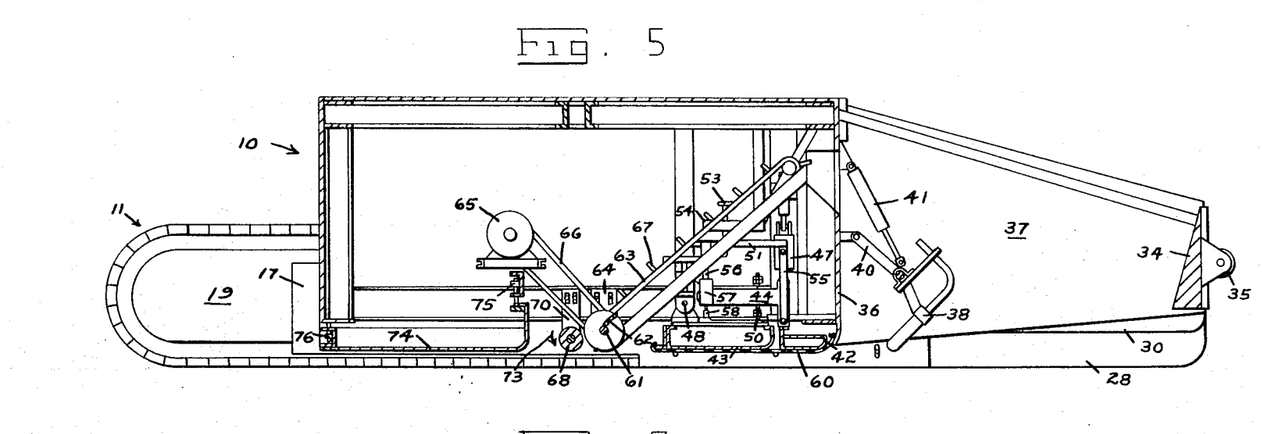
FIGURE 5 is a view similar to FIGURE 4, taken along line 5—5 in FIGURE 2.
Figure 6:
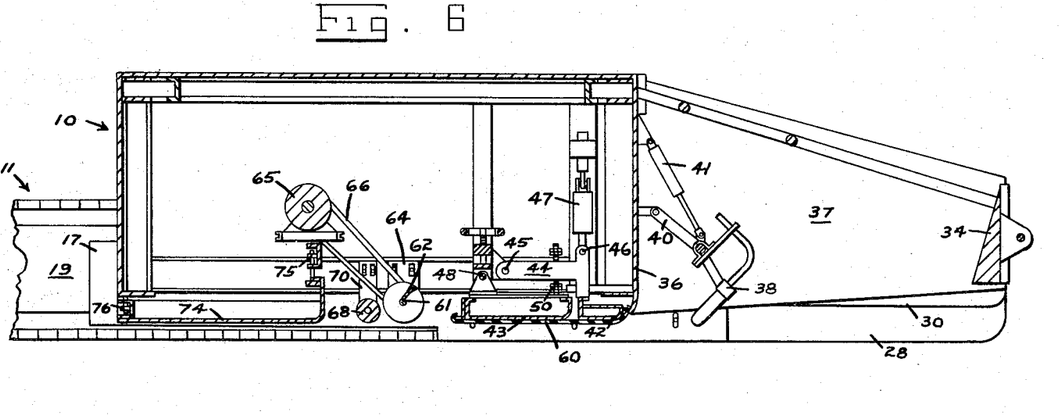
FIGURE 6 is a view similar to FIGURE 4 taken along line 6—6 in FIGURE 2.

The slipform illustrated in the drawings utilizes two separate assemblies for controlling and spreading concrete, either of which might be used alone in particular instances or in combination as shown for greater accuracy. The first of these assemblies comprises two transverse metering pans 42 and 43 and is best seen in FIGURES 4 through 6 and in enlarged detail in FIGURE 10. Each twelve foot section of the machine is covered by the pans 42, 43, the center strip between the framework sections being smoothed by manual methods after placement of a conventional expansion joint between the pavement sections being poured.

The front pan 42 is substantially smaller than the rear pan 43. However, both have a flat bottom surface with a rounded forward edge so as to assist in gradually smoothing concrete passing beneath the respective pans 42, 43. The front pan 42 is mounted on the framework 10 for elevational adjustment by means of a crank 44 pivoted to the framework 10 at 45 and pivotally connected at 46 to the lower end of a piston rod for a cylinder assembly 47. The cylinder assembly 47 is anchored at its upper end about a pivotal connection to the framework 10, so that expansion or contraction of the cylinder assembly 47 will vary the elevational position of the front pan 42 relative to framework 10.

Rear pan 43 is a control or monitoring device for the front pan 42, which constitutes a movable gate or metering device for incoming concrete. The rear pan 43 is pivotally connected at its rear end to the framework 10 about an axis denoted as 48 at the lower end of a threaded shaft 49 threadably received in a collar 49a on framework 10. The vertical position of the pivotal axis 48 can be varied by adjustment of shaft 49. Thus the pan 43 is elevationally adjustable along its forward edge, being free to move within the limits provided by a mechanical stop 50. The stop 50 extends through the crank 44 and provides adjustable limits to the amount of elevational movement of pan 43 relative to the supporting crank 44 for pan 42. As will be seen, the movement of the respective pans 42 and 43 is very closely interrelated in the operation of the machine.

Figure 10:
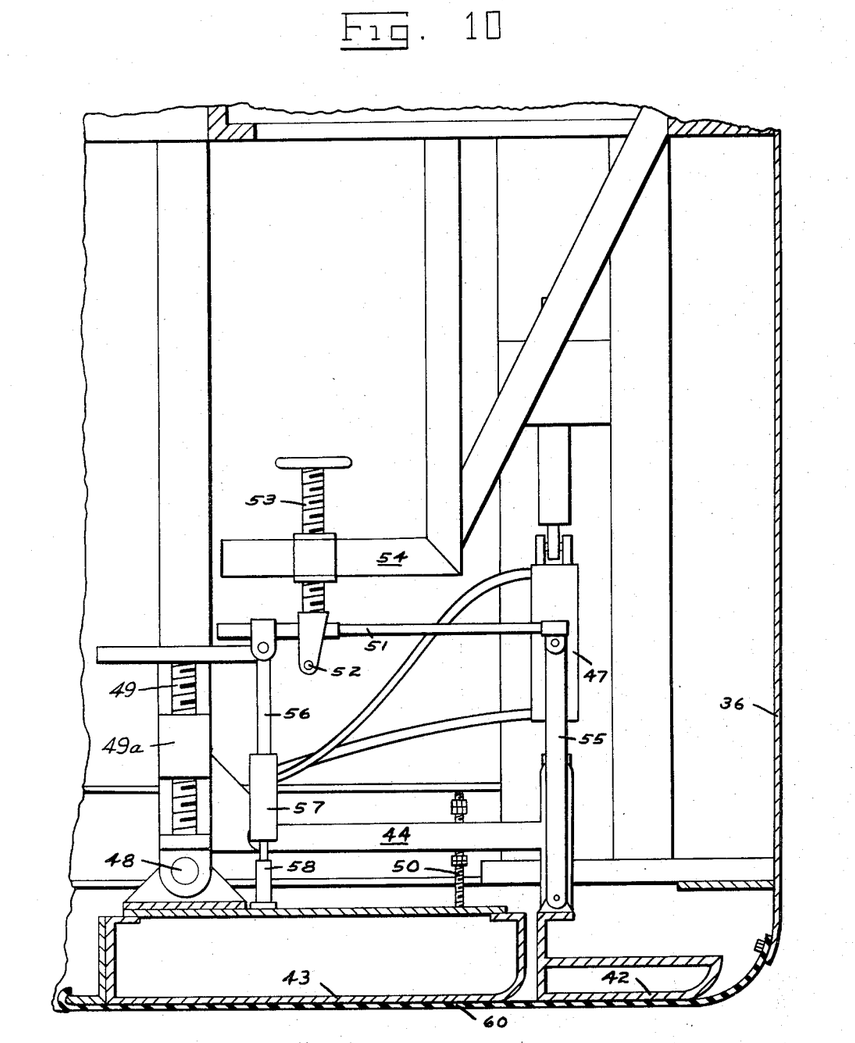
FIGURE 10 is an enlarged sectional view through the front metering apparatus as seen along line 10—10 in FIGURE 2.

The pans 42 and 43 are connected by an upper beam 51 pivotally mounted on the framework 10 about a pivotal axis 52 (FIGURE 10). The axis 52 of beam 51 is adjustable vertically by means of a manually controlled screw 53 and longitudinally adjustable along a supporting post 54 on the framework 10. The location of the pivot 52 governs the leverage provided between the two pans 42 and 43. At its forward end, the beam 51 is pivotally connected to the rear of the front pan 42 by a rigid link 55. Link 55 is pivotally connected at its upper and lower ends to the beam 51 and front pan 42 respectively. The rear portion of beam 51 is connected to a short rigid link 56 fixed to a valve housing 57 and a short bottom link 58 connecting the movable valve stem to the rear pan 43 at a point forward of the pivotal axis 48 of pan 43 on framework 10. The valve housing 57 is fixed to the top link 56. The bottom link 58 is connected to the movable operating stem of the valve 57.

Figure 13:
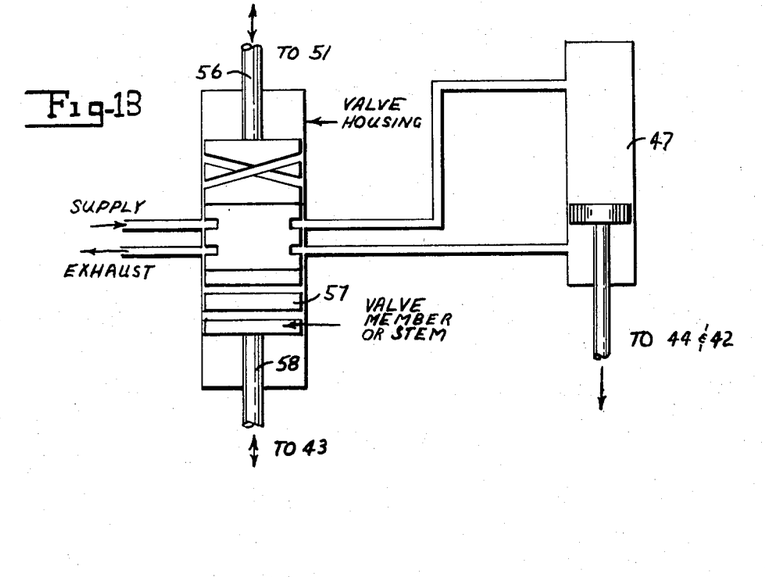
FIGURE 13 is a schematic view illustrating the structure and function of the valve assembly that controls concrete flow.

The valve 57 is a conventional four way control valve connected to the upper and lower parts of the double acting cylinder assemblies at each end of front pan 42. The connections between the valve 57 and cylinder assembly 47 at each end of the pan 42 are such that upward movement of the bottom link 58 will shift the position of the movable valve stem relative to the valve housing to direct fluid to the top ends of the cylinder assemblies 47 and thereby cause the cylinder assemblies 47 to move the front pan 42 downwardly (see FIGURE 13). Downward movement of front pan 42 will be transmitted through beam 51 to the valve housing 57, thereby returning the housing to its initial position relative to the stem and neutralizing the effect of the force previously exerted through link 58 and stabilizing the position of pan 42. The operation of valve 57 responsive to downward movement of the bottom link 58 and the neutralizing effect of the beam 51 responsive to correction of pan 42 is opposite to that described relative to upward movement of bottom link 58. The links 55 and 56, together with beam 51, provide a "feed back" mechanical connection to the relatively movable parts of valve 57 so that the elevational positions of the front and rear pans 42, 43 will stabilize at a substantially neutral position.

When excess concrete has passed the front pan 42 and lifts the rear pan 43, the action of the valve 57 will cause further restriction of the passage beneath front pan 42 until the balance between the pressures exerted on pans 42 and 43 is again attained. Likewise, if less concrete is detected by rear pan 43 and it drops relative to framework 10, valve 57 will cause the cylinder assemblies 47 to rise until the balance in pressure exerted on pans 42, 43 is again attained. In this manner, a constant amount of pressure will be exerted by concrete passing beneath pans 42, 43, so that excess concrete will not be permitted to escape rearwardly of pan 43, where it might boil out and provide a concrete surface of inconsistent depth.

While the pans 42, 43, might be used unexposed, it has been found advisable to provide a flexible skirt or member 60 fixed along its front edge to the bottom of the upright barrier 36 and fixed along its rear edge to the rear end of pan 43 (FIGURE 10). The purpose of the flexible member 60 is to prevent concrete from entering the space between pans 42, 43, which are located closely adjacent to one another, and to prevent entry of concrete above the front pan 43 when the volume of concrete passing beneath barrier 36 becomes too great for passage beneath the pan 42. The flexible member 60 does not interfere with the operation of pans 42, 43 as previously described. It is preferably made of rubber or other suitable material capable of withstanding the abrasion of the cementitious material, and can be fabricated from conventional conveyor belting.

After passage of the front and rear pans 42, 43, the concrete that has entered the machine is generally of the correct thickness and has a rather smooth surface configuration. However, for maximum accuracy, further surfacing of the concrete is required. The second assembly described below can be used either with the first assembly comprising metering pans 42, 43, or, in certain instances, might be utilized alone as the sole arrangement for controlling and spreading concrete.

Rearward of the pan 43 is an auger 61 in each section of the machine. Each auger has blades 62 formed in a spiral about its central shaft, the blades leading to a discharge conveyor 63 of the continuous belt type. The blades at each side of the conveyor 63 are opposite in pitch so as to move concrete towards the conveyor 63 in unison. The bearing mounts 64 for the augers 61 are vertically adjustable relative to the framework 10, the position of augers 61 being fixed during operation of the machine. The elevation of the bottom surfaces of augers 61 and the discharge conveyors 63 is equal to the desired surface elevation of the completed concrete. Augers 61 will therefore remove excess concrete from the surface thereof during passage of the framework 10 over a given area.

Each auger 61 is powered by a motor 65 through a belt or chain 66. The same auger shaft powers the continuous conveyor 63, which is provided with paddles 67 to insure movement of concrete along the length of the upper flight thereof. The upper end of the discharge conveyor 63 drops the concrete forward of the barrier 36 so that it is reused and not discarded.

For smoothing of the concrete surface after passage of auger 61, a cylindrical roll 68 is rotatably mounted on framework 10 directly rearward of each auger 61. The roll 68 is also mounted on vertically adjustable bearing mounts 70 and the lower surface of roll 68 is substantially equal in elevation to the lower edge of the auger 61 with which it is associated. Roll 68 is powered by a motor 71 (FIGURE 2) and a chain 72. The direction of rotation of roll 68 is as shown by arrow 73 in FIGURE 5, this direction being such that the lower surface of roll 68 is moving in a forward direction relative to the concrete contacted thereby.

Following the metering devices on framework 10, the final passage of a screed is desirable to finish the concrete surface. A rather large rearwardly extending screed 74 is shown rearward of roll 68 at each section of the machine. It is carried by adjustable bracket 75 at the forward end and 76 at its rear end. Again, in practice, the screed 74 is fixed during operation of the machine.

Any desired finishing jumbo or finishing platform could be mounted at the rear of framework 10, which might also carry apparatus for placing conventional expansion joints along the freshly laid concrete. Transverse joint forming devices could also be mounted on framework 10 is so desired.

Figure 11:
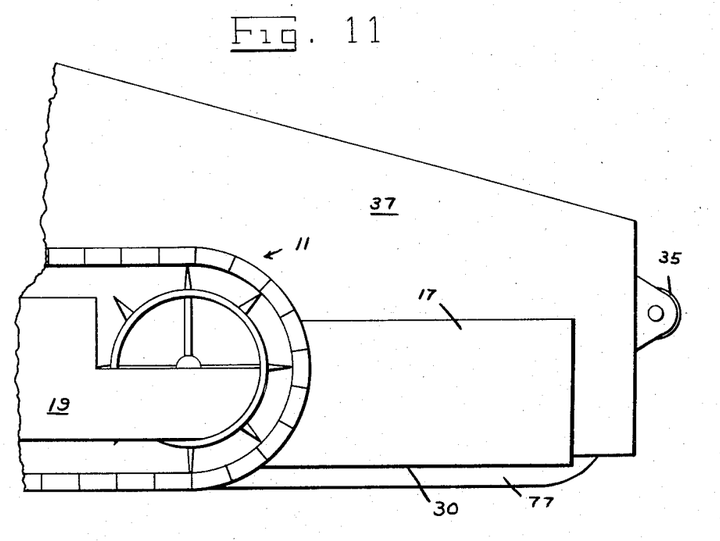
FIGURE 11 is a fragmentary side elevation view taken at the front end of a second embodiment of the machine including a modified concrete receiving section.
Figure 12:
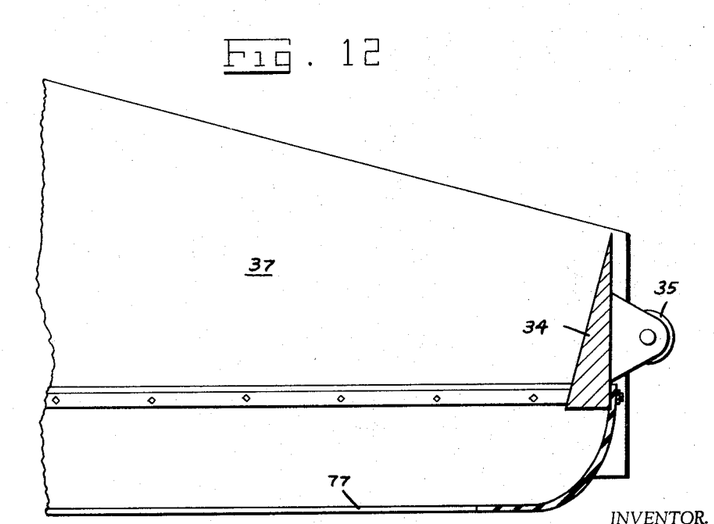
FIGURE 12 is a vertical section view taken longitudinally through the embodiment of the invention shown in FIGURE 11.

In FIGURES 11 and 12 is illustrated a modification of the header assembly, eliminating the mechanically pivoted sections 28 previously described. The structure of the headers 17, including the relieved bottom edge 30 is unchanged. However, in place of the mechanically pivoted section 28, there is shown a flexible rubber boot 77 which is fastened to the front wall 34 across the width of the machine and also on side walls 37 adjacent to and overlapping the relieved bottom edge 30 of headers 17. This boot 77, which is normally filled with concrete, will naturally conform to the surface on which it is riding, whether this be the prepared subgrade or obstructions such as a pavement slab. Again, this boot 77 permits the header 17 to ride over obstructions and previously poured slabs so that the lining apparatus can operate continuously despite the obstruction to bring the concrete formed by the slipform into abutment with a completed slab.

The above description shows rather completely a mechanical device for metering and smoothing concrete as it is being laid along a highway right of way. The precise metering devices illustrated cooperatively produce a highly accurate surface when used in conjunction with effective controls. The combination of front pan 42 and rear pan 43 provides an automatically corrected device for allowing passage of concrete into the machine with a consistent hydraulic pressure. The augers 61 and discharge conveyor 63 in each section of the machine mechanically remove excess concrete that might have passed into the machine, while the roll 68 and the final finishing screed 74 produce a smooth finished surface requiring little or no hand finishing. All of the devices extend completely across the width of the pavement, the edges being normally hand treated in any event due to the necessity of forming joints and corner surfaces.

The headers 17 normally are maintained in a vertical position by the cylinders 21, these cylinders 21 being used to retract headers 17 at the end of a day's work so that they can be cleaned prior to setting the machine aside. All of the various devices are open for visual inspection by one operating the machine from the platform 78 shown in FIGURE 1. Normally, the operator of the machine will be stationed at a control panel 80, the necessary power for the various control and driving devices being produced by an engine 81. Other vibrators and compacting devices can be mounted on the pans 42, 43 and on screed 74 if this is desired.

Modifications can be made in the detailed structure just described without deviating from the basic idea of the invention. It is therefore necessary to understand that the embodiment of the invention shown in the above description is not intended to limit the scope of the invention, which is set out in the following claims.

Having thus described my invention, I claim:

1. In a slipform of the type adapted to pour a lining of cementitious material over a surface traversed thereby during forward movement of the slipform;

a mobile framework;

first transverse metering means extending across said framework (at least a portion of) the lower surface of said first metering means being mounted on said framework for elevational motion relative to said framework, said lower surface being spaced above the surface to be lined;

second metering means extending across said framework, said second metering means being mounted on said framework rearwardly of said first metering means (at least a portion of) the lower surface of said second metering means being mounted on said framework for elevational motion relative to said framework, said lower surface of said second metering means being spaced above the surface to be lined at a height sufficiently equal to the spacing of said lower surface of said first metering means;

power means on said framework operatively connected to said first metering means to selectively effect elevational movement of the lower surface of said first metering means relative to said framework;

(first) control means operatively connected to said second metering means and to said power means to alternately cause said means to raise said first metering means responsive to lowering of the lower surface of said second metering means relative to said framework and to lower said first metering means responsive to raising of the lower surface of said second metering means relative to said framework;

and a linkage operatively connected to said first metering means and to said first control means adapted to neutralize said first control means responsive to elevational motion of the lower surface of said first metering means as effected by said power means.

2. A slipform as defined in claim 1 further comprising: a continuous flexible member extending across the width of said framework beneath both of said first and second metering means in contact with the lower surfaces thereof, the forward edge of said member being anchored to said framework.

3. A slipform as defined in claim 1 further comprising: an auger rotatably mounted on said framework about a horizontal transverse axis, said auger being positioned rearwardly of said first and second metering means, the lower edge of said auger being at an elevation substantially equal to the lowermost elevation of the lower surfaces of said first and second metering means;

power means on said framework operatively connected to said auger to rotate said auger about its axis on said framework; and discharge means cooperatively engaged with said auger adapted to receive excess cementitious material conveyed thereto by rotation of said auger.

4. A slipform as defined in claim 1 further comprising: an auger rotatably mounted on said framework about a horizontal transverse axis, said auger being positioned rearwardly of said first and second metering means, the lower edge of said auger being at an elevation substantially equal to the lowermost elevation of lower surfaces of said first and second metering means;

power means on said framework operatively connected to said auger to rotate said auger about its axis on said framework;

discharge means cooperatively engaged with said auger adapted to receive excess cementitious material conveyed thereto by rotation of said auger;

and fixed screed means mounted on said framework rearwardly of said auger, the lowermost surface of said screed means being at an elevation substantially equal to the lowermost elevation of the lower surfaces of said first and second metering means.

5. A slipform as defined in claim 1 further comprising: an auger rotatably mounted on said framework about a horizontal transverse axis, said auger being positioned rearwardly of said first and second metering means, the lower edge of said auger being at an elevation substantially equal to the lowermost elevation of the lower surfaces of said first and second metering means;

power means on said framework operatively connected to said auger to rotate said auger about its axis on said framework;

discharge means cooperatively engaged with said auger adapted to receive excess cementitious material conveyed thereto by rotation of said auger;

fixed screed means mounted on said framework rearwardly of said auger, the lowermost surface of said screed means being at an elevation substantially equal to the lowermost elevation of the lower surfaces of said first and second metering means;

a smooth surfaced roller rotatably mounted on said framework intermediate said auger and said screed means, the lowermost elevation of the roller surface being at an elevation substantially equal to the lowermost elevation of said first and second metering means, said roller being rotatably mounted on said framework about an axis parallel to the axis of said auger means;

and means on said framework operatively connected to said roller to rotate said roller in a direction such that the lower surface of said roller moves in a forward direction relative to the surfacing material contacted thereby.

6. In a slipform for cementitious material:

a mobile framework;

first transversely extending metering means mounted on said framework for elevational motion relative to said framework, said first metering means being spaced above the surface to be lined;

second transversely extending metering means mounted on said framework rearwardly adjacent to said first metering means for elevational motion relative to said framework, said second metering means being spaced above the surface to be lined at a height substantially equal to the spacing of said first metering means;

a beam mounted on said framework for pivotal motion about a transverse axis;

first and second links respectively connected to said first and second metering means respectively and to said beam at longitudinally spaced locations thereon on opposite sides of the beam axis;

power means on said framework operatively connected to said first metering means to selectively move said first metering means elevationally relative to said framework;

control means for said power means, said control means being interposed in the link connected to said beam and said second metering means and having relatively movable elements operatively connected to said beam and said second metering means respectively to actuate said power means and elevationally adjust said first metering means thereby in opposed relationship to elevational motion of said second metering means, the beam and links being effective to neutralize said control means when said power means sufficiently moves said first metering means.

7. A slipform as defined in claim 6 further comprising: a metering auger assembly extending transversely across said framework rearwardly of said first and second metering pans;

means on said framework operatively connected to said auger adapted to rotate said auger continuously during operation of the slipform;

discharge means operatively connected to said auger adapted to carry excess material engaged thereby;

and rearwardly extending fixed screed means located across said framework rearward of said auger to smooth surfacing material after passage of said metering pans and auger.

References Cited

UNITED STATES PATENTS

| 2,590,443 | 3/1952 | Miller | 94—44 |
| 2,403,820 | 7/1946 | Miller | 94—44 |
| 2,046,417 | 7/1936 | Talbot et al. | 94—44 |
| 2,201,493 | 5/1940 | Jorgenson | 94—44 X |
| 2,597,221 | 5/1952 | Barber | 94—46 |
| 2,911,892 | 11/1959 | Pollitz | 94—46 |
| 2,976,784 | 3/1961 | Perkins et al. | 94—45 |

JACOB L. NACKENOFF, *Primary Examiner.*